(12) United States Patent
Le et al.

(10) Patent No.: US 12,136,446 B2
(45) Date of Patent: Nov. 5, 2024

(54) TDMR SOT READ HEADS HAVING RECESSED TOPOLOGICAL INSULATOR MATERIALS

(71) Applicant: Western Digital Technologies, Inc., San Jose, CA (US)

(72) Inventors: Quang Le, San Jose, CA (US); Rohan Babu Nagabhirava, Virginia Beach, VA (US); Xiaoyong Liu, San Jose, CA (US); Brian R. York, San Jose, CA (US); Son T. Le, San Jose, CA (US); Cherngye Hwang, San Jose, CA (US); Kuok San Ho, Emerald Hills, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,625

(22) Filed: Jul. 26, 2023

(65) Prior Publication Data

US 2024/0144960 A1 May 2, 2024

Related U.S. Application Data

(60) Provisional application No. 63/420,842, filed on Oct. 31, 2022.

(51) Int. Cl.
*G11B 5/31* (2006.01)
*G11B 5/11* (2006.01)

(52) U.S. Cl.
CPC ............. *G11B 5/11* (2013.01); *G11B 5/3116* (2013.01)

(58) Field of Classification Search
None
See application file for complete search history.

(56) References Cited

U.S. PATENT DOCUMENTS

| | | | |
|---|---|---|---|
| 9,947,347 B1 | 4/2018 | Van Der Heijden et al. | |
| 10,181,334 B1 * | 1/2019 | Song | G11B 5/1278 |
| 10,580,441 B1 * | 3/2020 | Chen | G11B 5/6082 |
| 10,720,570 B2 | 7/2020 | Le et al. | |
| 11,094,338 B1 * | 8/2021 | Hwang | G11B 5/315 |
| 11,100,946 B1 * | 8/2021 | Le | G11B 5/3932 |
| 11,205,447 B2 | 12/2021 | Chen et al. | |
| 11,222,656 B1 * | 1/2022 | Le | G11B 5/372 |
| 11,282,538 B1 * | 3/2022 | Kief | G11B 5/3912 |
| 11,489,108 B2 * | 11/2022 | Le | H10N 52/00 |
| 2012/0206830 A1 | 8/2012 | Gao et al. | |

(Continued)

*Primary Examiner* — William J Klimowicz
(74) *Attorney, Agent, or Firm* — PATTERSON + SHERIDAN, LLP (57) ABSTRACT

The present disclosure generally relates to a two dimensional magnetic recording (TDMR) spin-orbit torque (SOT) read head comprising bismuth antimony (BiSb) layers. The read head comprises a lower reader comprising a first SOT stack and an upper reader comprising a second SOT stack. The first SOT stack and the second SOT stack each individually comprise a BiSb layer recessed from a media facing surface (MFS) and a free layer exposed at the MFS. The BiSb layers of each SOT stack are recessed from the MFS a distance of about 5 nm to about 20 nm, the distance being less than a length of the free layers. In one embodiment, the lower reader and the upper reader share a current path. In another embodiment, the lower reader and the upper reader have separate current paths.

28 Claims, 6 Drawing Sheets

(56) References Cited

U.S. PATENT DOCUMENTS

| | | | |
|---|---|---|---|
| 2014/0226239 A1* | 8/2014 | Mihajlovic | G01R 33/07 360/112 |
| 2018/0358543 A1* | 12/2018 | Le | G11B 5/3903 |
| 2020/0212104 A1* | 7/2020 | Sonobe | H10N 50/85 |
| 2022/0005498 A1* | 1/2022 | Le | H10N 52/80 |
| 2022/0013138 A1* | 1/2022 | Hwang | G11B 5/39 |
| 2023/0306993 A1* | 9/2023 | Le | G11B 5/39 |

\* cited by examiner

TDMR SOT READ HEADS HAVING RECESSED TOPOLOGICAL INSULATOR MATERIALS

CROSS-REFERENCE TO RELATED APPLICATIONS

This application claims benefit of U.S. provisional patent application Ser. No. 63/420,842, filed Oct. 31, 2022, which is herein incorporated by reference.

BACKGROUND OF THE DISCLOSURE

Field of the Disclosure

Embodiments of the present disclosure generally relate to two dimensional magnetic recording (TDMR) spin-orbit torque (SOT) read heads comprising bismuth antimony (BiSb) layers.

Description of the Related Art

BiSb layers are narrow band gap topological insulators with both giant spin Hall effect and high electrical conductivity. BiSb is a material that has been proposed in various spin-orbit torque (SOT) device applications, such as for a spin Hall layer for magnetoresistive random access memory (MRAM) devices and energy-assisted magnetic recording (EAMR) write heads.

However, utilizing BiSb materials in commercial SOT applications can present several obstacles. For example, BiSb materials have low melting points, large grain sizes, significant Sb migration issues upon thermal annealing due to its film roughness, difficulty maintaining a desired (012) or (001) orientation for maximum spin Hall effect, and are generally soft and easily damaged by ion milling.

Therefore, there is a need for an improved SOT device in TDMR reader configurations utilizing BiSb layer(s) having a desired crystal orientation and a high signal-to-noise ratio.

SUMMARY OF THE DISCLOSURE

The present disclosure generally relates to a two dimensional magnetic recording (TDMR) spin-orbit torque (SOT) read head comprising bismuth antimony (BiSb) layers. The read head comprises a lower reader comprising a first SOT stack and an upper reader comprising a second SOT stack. The first SOT stack and the second SOT stack each individually comprises a BiSb layer recessed from a media facing surface (MFS) and a free layer exposed at the MFS. The BiSb layers of each SOT stack are recessed from the MFS a distance of about 5 nm to about 20 nm, the distance being less than a length of the free layers. In one embodiment, the lower reader and the upper reader share a current path. In another embodiment, the lower reader and the upper reader have separate current paths.

In one embodiment, a read head comprises a lower shield extending to a media facing surface (MFS), a first spin-orbit torque (SOT) stack disposed over the lower shield, the first SOT stack comprising: a first bismuth antimony (BiSb) layer recessed from the MFS, and a first free layer disposed over the first BiSb layer, the first free layer being exposed at the MFS, a middle shield disposed over the first free layer, the middle shield extending to the MFS, a second SOT stack disposed over the middle shield, the second SOT stack comprising: a second BiSb layer recessed from the MFS, and a second free layer disposed over the second BiSb layer, the second free layer being exposed at the MFS, and an upper shield disposed over the second free layer, the upper shield extending to the MFS.

In another embodiment, a read head comprises a first reader, the first reader comprising: a first lower shield extending to a media facing surface (MFS), a first bismuth antimony (BiSb) layer disposed over the first lower shield, the first BiSb layer being recessed from the MFS, a first free layer disposed over the first BiSb layer, the first free layer being exposed at the MFS, and a first upper shield disposed over the first free layer, and a second reader disposed over the first upper shield, the second reader comprising: a second lower shield extending to the MFS, a second BiSb layer disposed over the second lower shield, the second BiSb layer being recessed from the MFS, a second free layer disposed over the second BiSb layer, the second free layer being exposed at the MFS, and a second upper shield disposed over the second free layer.

In yet another embodiment, a read head comprises a first reader, the first reader comprising: a first lower shield extending to a media facing surface (MFS), a first free layer disposed over the first lower shield, the first free layer being exposed at the MFS, a first bismuth antimony (BiSb) layer disposed over the first free layer, the first BiSb layer being recessed from the MFS, and a first upper shield disposed over the first BiSb layer, and a second reader disposed over the first upper shield, the second reader comprising: a second lower shield extending to the MFS, a second free layer disposed over the second lower shield, the second free layer being exposed at the MFS, a second BiSb layer disposed over the second free layer, the second BiSb layer being recessed from the MFS, and a second upper shield disposed over the second BiSb layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a two dimensional magnetic recording (TDMR) spin-orbit torque (SOT) read head comprising bismuth antimony (BiSb) layers. The read head comprises a lower reader comprising a first SOT stack and an upper reader comprising a second SOT stack. The first SOT stack and the second SOT stack each individually comprises a BiSb layer recessed from a media facing surface (MFS) and a free layer exposed at the MFS. The BiSb layers of each SOT stack are recessed from the MFS a distance of about 5 nm to about 20 nm, the distance being less than a length of the free layers. In one embodiment, the lower reader and the upper reader share a current path. In another embodiment, the lower reader and the upper reader have separate current paths.

A BiSb layer having a (012) orientation or a (001) orientation has a significant spin Hall angle and high electrical conductivity. Therefore, a BiSb layer having a (012) orientation or a (001) orientation can form a SOT device. For example, a BiSb layer having a (012) orientation or a (001) orientation can be used as a spin Hall layer in a spin-orbit torque device in a magnetic recording head, e.g., as part of a write head (MAMR). In another example, a BiSb layer having a (012) orientation or a (001) orientation can be used in nano oscillator devices for reading head applications where a signal is detected in the frequency domain. In another example, a BiSb layer having a (012) orientation or a (001) orientation can be used as a spin Hall electrode layer in an MRAM device. The SOT device can be in a perpendicular stack configuration or an in-plane stack configuration. The SOT device can be utilized in, for example, MAMR writing heads, read head, nano-oscillator based reader, MRAM, artificial intelligence chips, and other applications.

Figure 1:
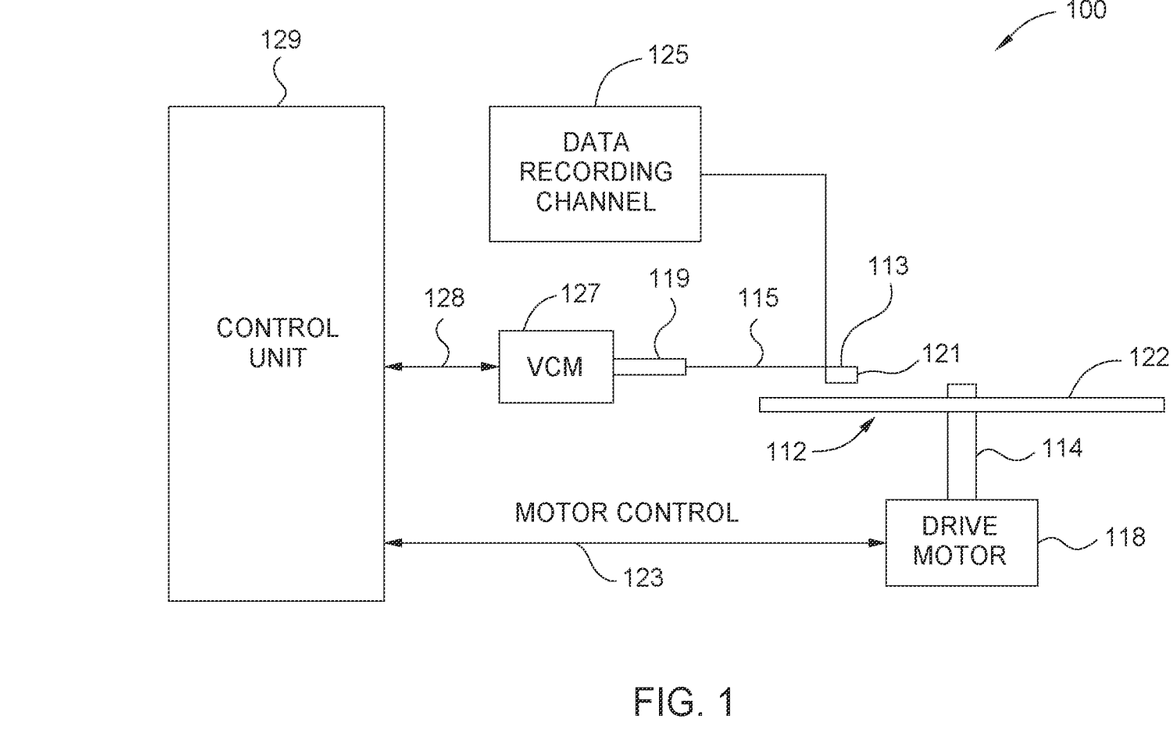
FIG. 1 is a schematic illustration of certain embodiments of a magnetic media drive including a magnetic recording head having a SOT device.

FIG. 1 is a schematic illustration of certain embodiments of a magnetic media drive 100 including a magnetic recording head having a SOT device. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
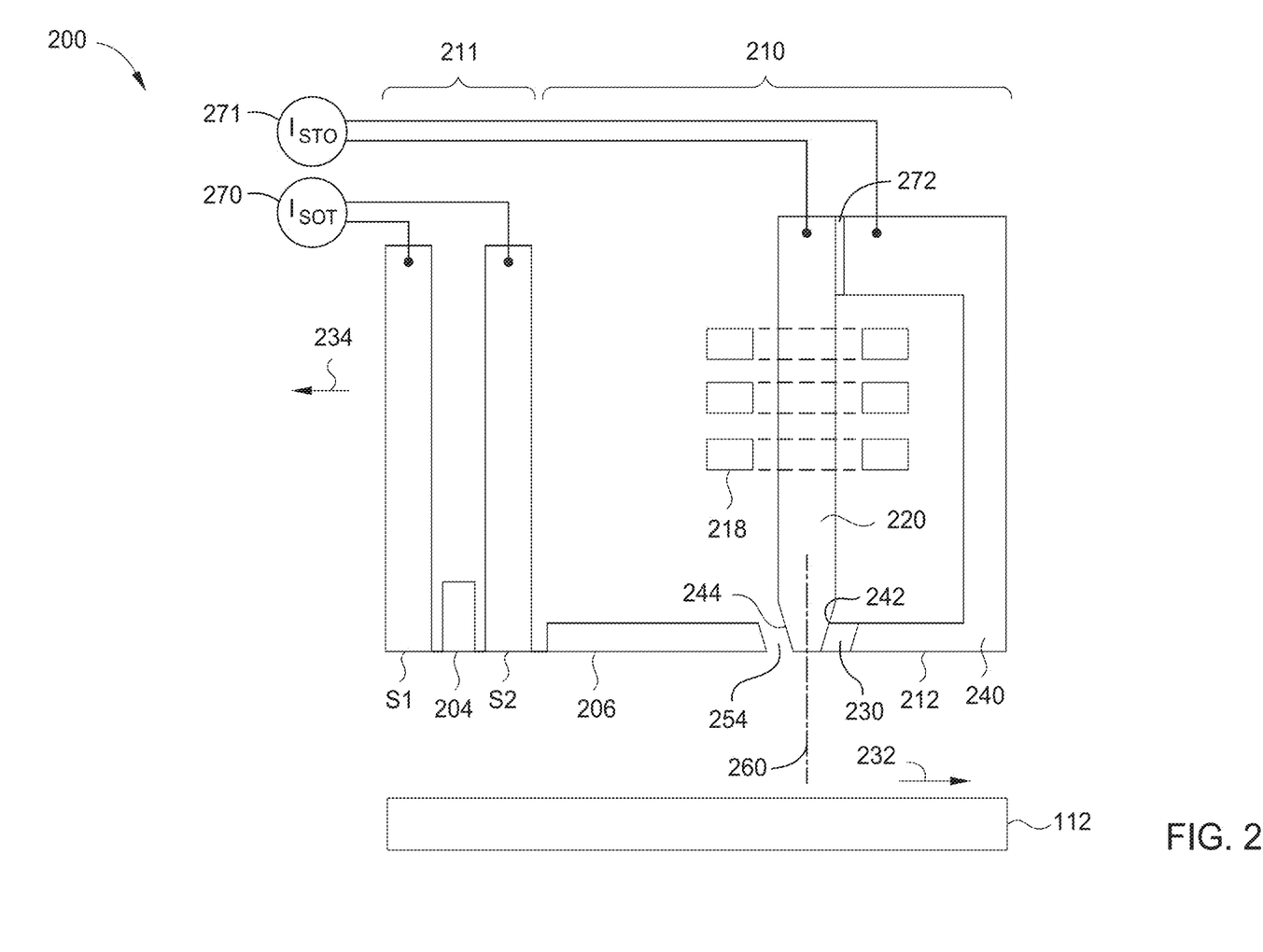
FIG. 2 is a fragmented, cross-sectional side view of certain embodiments of a read/write head having a SOT device.

At least one slider 113 is positioned near the magnetic disk 112, each slider 113 supporting one or more magnetic head assemblies 121 that include a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders. It is to be understood that the embodiments discussed herein are applicable to a data storage device such as a hard disk drive (HDD) as well as a tape drive, such as those conforming to the LTO (Linear Tape Open) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

FIG. 2 is a fragmented, cross-sectional side view of certain embodiments of a read/write head 200 having a SOT device. It is noted while an SOT device is shown in both the read head and write head, this is for illustrative purposes only, and an SOT device may be independently integrated into either only the read head or only the write head in various embodiments, or in both the read head and the write head. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a SOT read head that includes an SOT sensing element 204 located between reader shields S1 and S2, where a first current source 270 is coupled to S1 and S2 via one or more lead connections to provide a current to the SOT sensing element 204. In some embodiments, a lead connection may be coupled to a shield within the SOT sensing device. Voltage detection leads (not shown) are within the SOT sensing element 204. The magnetic fields of the adjacent magnetized regions in the magnetic disk 112 are detectable by the SOT sensing element 204 as the recorded bits. In SOT sensing elements 204 comprising a BiSb layer, such as the SOT devices described in FIGS. 3A-6B, current flows perpendicular to the film plane, and the signal is read out by measuring the voltage in the BiSb layer generated by the inverse spin Hall effect. The SOT device of various embodiments can be incorporated into the read head 211.

The write head 210 includes a main pole 220, a leading shield 206, a trailing shield 240, and a coil 218 that excites the main pole 220, where a second current source 271 is coupled to the main pole 220 and the trailing shield 240. The coil 218 may have a "pancake" structure which winds around a back-contact between the main pole 220 and the trailing shield 240, instead of a "helical" structure shown in FIG. 2. In one embodiment, the write head 210 is a perpendicular magnetic recording (PMR) write head. In other embodiments, the write head 210 may use energy assisted magnetic recording (EAMR) technologies such as microwave assisted magnetic recording (MAMR) and heat assisted magnetic recording (HAMR).

In FIG. 2, optionally a spin orbital torque (SOT) device 230 is shown as part of the write head structure to enable a MAMR recording effect, in one embodiment. As noted above, while an SOT device is shown in FIG. 2 for both the read head and the write head, the SOT devices are not required to be implemented in both. For example, the write head may instead include other components to support HAMR in which case SOT device 230 may be absent. The SOT device 230 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer (not shown). The trailing shield hot seed layer can include a high moment sputter material, such as CoFe, CoFeNi, CoFex, FeX, or FeXN, where X includes at least one of Rh, Al, Ta, Zr, Co, Fe, N, and Ti. In certain embodiments, the trailing shield 240 does not include a trailing shield hot seed layer.

In some embodiments, the read head 211 is a spin torque oscillator (STO) read head with an STO oscillator sensing element 204 located between shields S1 and S2. The magnetic fields of the adjacent magnetized regions in the magnetic disk 112 are detectable by the STO sensing element 204 as the recorded bits. The STO sensing elements 204 comprise a BiSb layer, such as an SOT stacks of FIGS. 3A-3B. The STO reader may be operated in a 4-terminal or a 3-terminal configuration, with an out-of-plane current flowing inside the SOT structure while a sensing voltage is read out in the film plane. The SOT device of various embodiments can be incorporated into the read head 211.

Figure 3A:
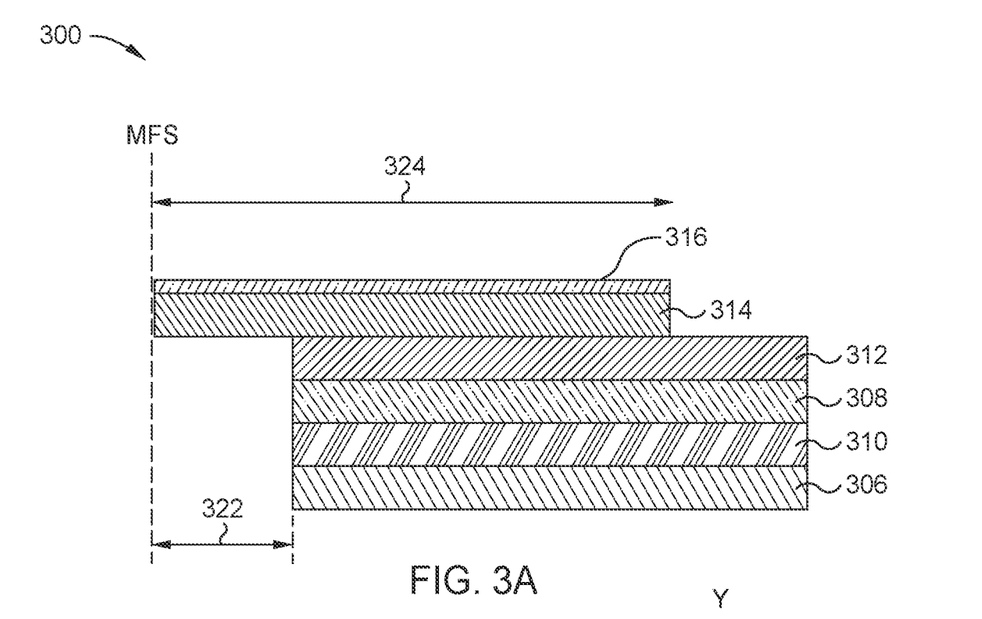
FIGS. 3A-3B illustrate cross-sectional views of a spin-orbit torque (SOT) stacks, according to various embodiments.
Figure 3B:
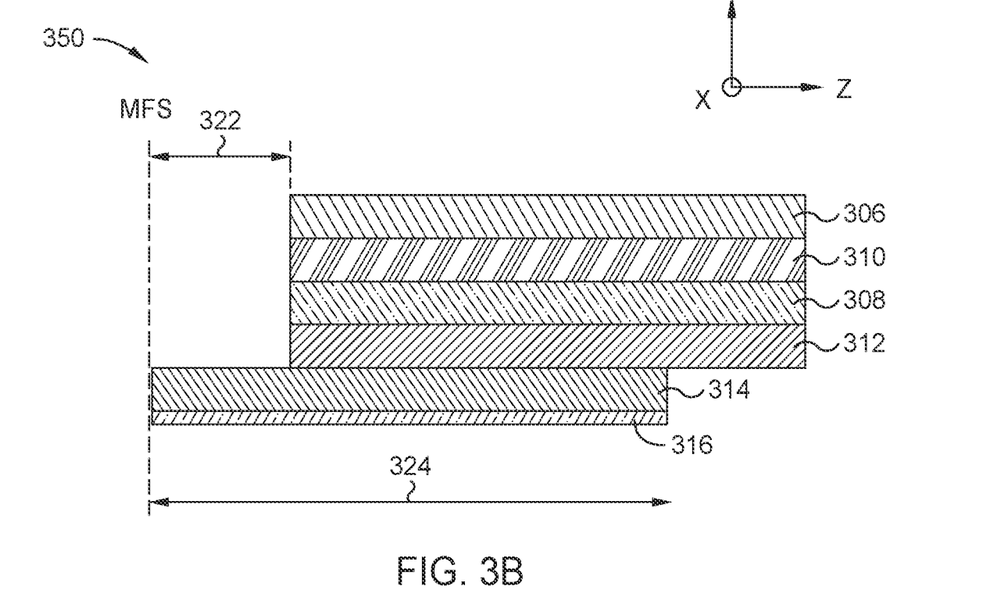

FIGS. 3A-3B illustrate cross-sectional views of a spin-orbit torque (SOT) stacks 300, 350, according to various embodiments. FIG. 3A and FIG. 3B are similar; however, FIG. 3B is a reversed stack. The SOT stacks 300, 350 may be used in the magnetic recording head of the drive 100 of FIG. 1 or other suitable magnetic media drives, such as the read head 211 and/or write head 210 of FIG. 2. Furthermore, the SOT stacks 300, 350 may each individually or collectively be utilized in the two dimensional magnetic recording (TDMR) SOT read heads 400, 500, and 600 of FIGS. 4A-6B.

Furthermore, while the SOT stacks 300, 350 are referred to as SOT stacks, the SOT stacks 300, 350 may function as spin torque oscillator (STO) devices. When the SOT stacks 300, 350 are used in a write head, the current flows in-plane to the SOT layer or bismuth antimony (BiSb) layer 310, and the ferromagnetic (FM) or free layer is oscillated by the SOT generated by the spin Hall effect in the BiSb layer 310.

The SOT stacks 300 of FIG. 3A comprises a buffer layer 306, a spin Hall effect (SHE) layer or BiSb layer 310 disposed on the buffer layer 306, an interlayer 308 disposed on the SHE layer 310, a ferromagnetic (FM) layer 312 disposed on the interlayer 308, a free layer 314 disposed on the FM layer 312, and a cap layer 316 disposed on the free layer 314. The SOT stacks 350 of FIG. 3B comprises the cap layer 316, the free layer 314 disposed on the cap layer 316, the FM layer 312 disposed on the free layer 314, the interlayer 308 disposed on the FM layer 312, the SHE layer 310 disposed on the interlayer 308, and the buffer layer 306 disposed on the SHE layer 310. Each SOT stack 300, 350 may comprise additional layers not shown, such as a seed layer and/or a migration barrier layer. The FM layer 312 is optional, and may be a part of the free layer 314.

As discussed further below in FIGS. 4A-6B, the buffer layer 306, the SHE layer 310, the interlayer 308, and the FM layer 312 are recessed from the MFS by a portion of an insulation layer (not shown) and/or a S1 lower shield notch (not shown). The free layer 314 and the cap layer 316 are disposed at the MFS. The buffer layer 306, the SHE layer 310, the interlayer 308, and the FM layer 312 are recessed from the MFS a distance 322 in the z-direction of about 5 nm to about 20 nm. The free layer 314 and the cap layer 316 each individually has a stripe height 324 in the z-direction of about 10 nm to about 20 nm. The distance 322 the buffer layer 306, the SHE layer 310, the interlayer 308, and the FM layer 312 are recessed from the MFS is less than the stripe height 324. The buffer layer 306, the SHE layer 310, the interlayer 308, and the FM layer 312 may also have a stripe height in the z-direction of about 10 nm to about 20 nm.

The SHE layer 310 comprises BiSb, and may be referred to as a BiSb layer 310, a SOT layer 310, and/or a topological insulator (TI) layer 310. The BiSb layer 310 may have a thickness in the y-direction of about 60 Å to about 200 Å. The BiSb layer 310 may comprise undoped BiSb or doped BiSbX, where the dopant is less than about 10%, and where X is extracted from elements which don't readily interact with either Bi or Sb, such as Cu, Ag, Ge, Mn, Ni, Co Mo, W, Sn, B, In, Te, Se, Y, Pt, Ti, or in alloy combinations with one or more of aforementioned elements, like CuAg, CuNi, CoCu, AgSn. The BiSb layer 310 may have a (012) crystal orientation or a (001) crystal orientation.

The cap layer 316 may comprise nonmagnetic, high resistivity materials, such as: thin ceramic oxides or nitrides of TiN, SiN, and MgO; amorphous/nanocrystalline metals such as NiFeTa, NiTa, NiHf, NiFeHf, CoHf, CoFeHf, NiWTa, NiFeW, NiW, WRe, beta-Ta, and beta-W; or nitrides, oxides, or borides of above-mentioned elements, compounds, and/or alloys such as NiTaN, NiFeTaN, NiWTaN, NiWN, WReN, TaN, WN, TaOx, WOx, WB, HfB, NiHfB, NiFeHfB, CoHfB, and CoFeHfB, where x is a numeral. In some embodiments, lower atomic number (Z) materials are preferred in the cap layer 316 to reduce sputter intermixing with the FM layer 312, but high Z alloys can be used, if used in combination with a migration barrier beneath, or if the high Z elements are used with a high resistive oxide, nitride, or boride. The cap layer 316 can comprise multilayer combinations of the above-mentioned materials, and the overall thickness of the cap layer 316 in the y-direction is less than or equal to about 100 Å (nominally about 15 Å to about 50 Å).

The FM layer 312 has a thickness of about 5 Å to about 15 Å in the y-direction, and may comprise NiFe, CoFe, NiFeX, CoFeX, FeX, or NiX, where X=Co, Ni, Cu, Si, Al, Mn, Ge, Ta, Hf, and B. The FM layer 312 may comprise any magnetic layer combination or alloy combination of these elements that can yield a low coercivity, negative magnetostrictive FM layer 312 or in multilayer combinations with other higher polarizing materials like Heusler alloys or high Ni containing alloy FM layers. The free layer 314 may comprise CoFeB, Co, CoFe, NiFe, or similar materials as the FM layer 312.

In some embodiments, each of the buffer layer 306 and the interlayer 308 comprises magnetic or nonmagnetic Heusler alloys, where the Heusler alloys may be full Heusler alloys (i.e., $X_2YZ$) or half Heusler alloys (i.e., XYZ). Full $X_2YZ$ type Heusler alloys generally have L21, cF16, or C1b type structures with an a-axis between about 5.70 Å and about 6.20 Å, which perfectly matches to RuAl or CrMo texturing layer 452. Half XYZ type Heusler alloys generally have a B2 type or Pm-3m type structure with a-axis between about 2.85 Å to about 3.10 Å. However, the type or structure may vary with respect to both half and full Heusler alloys. For instance, RuMnAl, RhMnAl, and $Al_2CuRh$, have a Pm-3m structure, and $Ni_2MnAl$ and $Mn_2NiAl$ have cF16 structures while $Al_2NiMn$ has a B2 structure.

With both full and half Heusler alloys, X may be one of Li, Mg, Mn, Fe, Co, Ni, Cu, Ru, Rh, Pd, Ag, Cd, Ir, Pt, or Au; Y may be one of Li, Be, Sc, Ti, V, Cr, Mn, Fe, Co, Ni, Zn, Y, Zr, Nb, Mo, Hf, or W; and Z may be one of B, Mg, Al, Si, Zn, Ga, Ge, As, In, Sn, Sb, Pb, or Bi. Some nonmagnetic Heusler alloy examples include $Ti_2MnAl$, $Fe_2VAl$ (a-axis=5.78 Å), $Cr_2CoAl$ (a-axis=5.88 Å), CoTiSb (a-axis=5.88 Å), $Mn_2VSi$, $V_2VAl$ (a-axis=6.14 Å), $[Mn_{1-x}Co_x]_2VAl$ (x=0.5) (a-axis=6.05 Å), $[Mn_{1-x}Co_x]_2VSi$ (x=0.25) (a-axis=6.18 Å), and CoMnNbAl, CoZrFeAl. Magnetic Heusler alloy examples having large spin polarizations include $Co_2MnSb$ (a-axis=5.94 Å), $Co_2MnGe$ (a-axis=5.75 Å), CoMnSb (a-axis=5.90 Å) NiMnSb, $Co_2FeGe$, $Co_2MnSn$, and $Co_2MnFeGe$, each of which does not readily mix with the BiSb layer 310.

Moreover, in some embodiments, each of buffer layer 306 and the interlayer 308 comprises: (1) amorphous/nanocrystalline layers formed from Heusler alloys in combination with elements, or alloy layers that don't readily mix with the SOT or FM layers, or uniform alloys formed by co-sputtering Heusler alloys with other elements, or alloys which don't readily intermix with SOT or FM layer, or (2) polycrystalline Heusler alloys, which are epitaxial layers in the SOT stacks 300, 350. With respect to amorphous/nanocrystalline buffer layers 306 and the interlayers 308, thin polycrystalline Heusler alloys (both magnetic and nonmagnetic, and full or half Heusler alloys) can be used when alloyed with other elements that don't readily mix with the BiSb layer 310, such as Cu, Ag, Ge, Mn, Ni, Co Mo, W, Sn, B, Te, Se, Y, Pt, Ti, N, and In, or in alloy combinations with one or more of aforementioned elements, such as CuAg, CuNi, CoCu, AgSn.

With respect to polycrystalline Heusler alloys, thin layers of Heusler alloys, both magnetic and nonmagnetic, full or half Heusler alloys, can be used as the buffer layer 306 and the interlayer 308 in (100) textured layer SOT devices (SOT orientation in this scenario is (012)). Heusler alloys generally have higher resistivities then the FM layer 312, and transport spin currents or yield high spin polarization, while providing and maintaining (100) growth. Heusler alloys further have excellent lattice matching capabilities to MgO tunnel barrier layers and to bcc FM alloys. (100) texturing layers, such as a texture layer, can be used to establish the (100) texture, and non-magnetic Heusler $X_2YZ$ or XYZ having cF16 (C1b, L21) or B2 structures can be used to transmit the texture to the BiSb layer 310, which in turn grows a strong (012) texture for the BiSb layer 310 with an epitaxial bcc, B2, or C1b, cF16, L21 Heusler interlayer to produce a strong epitaxial (100) texture for the bcc or B2 FM layer 312.

Other non-Heusler, nonmagnetic materials that could be used for one or more of the epitaxial buffer layer 306 and/or the interlayer 308 for epitaxial growth are: B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V.

In some embodiments, the buffer layer 306 and/or the interlayer 308 can each be formed from thin ceramic oxide or nitride layers like TiN, WN, SiN, and $Al_2O_3$, and MgO in combination with other high resistive nonmagnetic material layers. The top portion of a multilayer interlayer 308 (e.g., not in direct contact with the FM layer 312) may also be comprise of high resistivity heavier metal amorphous or amorphous/nanocrystalline metals like NiFeTa, NiTa, NiHf, NiFeHf, CoHf, CoFeHf, NiWTa, NiFeW, NiW, and WRe; nanocrystalline metals like beta-Ta and beta-W; or nitrides, oxides, or borides of the aforementioned elements or alloys like NiTaN, NiFeTaN, NiWTaN, NiWN, WReN, TaN, WN, TaOx, WOx, TaBx, WBx, HfBx, NiHfB, NiFeHfB, and CoHfB, where x is a numeral. The bottom portion of the interlayer 308 can be an amorphous/nanocrystalline material formed from Heusler alloys or other magnetic alloy materials when combined with aforementioned non-interacting elements or alloy combinations of those elements. Higher resistivity nonmagnetic alloys which do not interact with the FM layer 312, such as CuAg, CuNi, NiAg, CoCu, NiAl, RuAl, RhAl, and AgSn, can also be used for the interlayer 308. The interlayer 308 can also be a polycrystalline nonmagnetic Heusler alloy or half Heusler alloy, or other B2 or bcc materials, such as AlX, where X=V, Mn, Fe, Co, Ni, Ru, Rh, and Nobel metals Re, Os, Ir, Pt, Au, and Pd or in alloy combinations thereof; CrMo, where Mo is between about 20% to about 50%, CrMoTi, Cr, MoV, CrMoW; or CrXY, where X and Y are each individually selected from the group consisting of: Al, Ti, Mn, Co, Ni, Ru, Mo, Rh, W, and V; or in any combination of these material layers which has a higher resistive non-interacting layer next to the FM layer 312, among others.

When alloyed with nonmagnetic materials that do not readily intermix with FM layer 312, examples of high resistive amorphous interlayers 308 materials include Ge/CoFe/CuAg (as used here "I" denotes separate sublayers in a stack or layer) (where Ge/CoFe may form a single layer at room temperature or may be deposited as an alloy layer, and where Ge has a thickness of about 6 Å, CoFe has a thickness of about 4 Å, and CuAg has a thickness of about 3 Å), CuAg/Ge/CoFe/CuAg (where CuAg/Ge/CoFe may form a single layer at room temperature or may be deposited as an alloy layer, and where CuGe has a thickness of about 3 Å, Ge has a thickness of about 5 Å, CoFe has a thickness of about 4 Å, and CuAg has a thickness of about 2 Å), or thin nonmagnetic alloy layers like CoFeGe, NiFeGe, CoFeGeAg, etc. (alloy composition for alloys with Ge should be greater than about 44 at. % Ge to render the alloy nonmagnetic). When alloyed with nonmagnetic materials that do not readily intermix with FM layer 312, additional examples of elements, compounds, or crystalline/amorphous/nanocrystalline materials that may be utilized as the interlayer 308 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å); Ge/CoFe/MgO (where Ge/CoFe may form a single layer at room temperature or may be deposited as an alloy layer, and where Ge has a thickness of about 6 Å, CoFe has a thickness of about 4 Å, and MgO has a thickness of about 3 Å); and MgO/Ge/CoFe (where Ge/CoFe may form a single layer at room temperature or may be deposited as an alloy layer, and where MgO has a thickness of about 3 Å, Ge has a thickness of about 6 Å, and CoFe has a thickness of about 4 Å). Examples of an interlayer 308 using alloys with $X_2YZ$ Heusler alloys would be Ge/Co$_2$FeGe (which may form a single layer at room temperature or may be deposited as an alloy layer, and where Ge is about 4 Å thick and Co$_2$FeGe is about 5 Å thick); or using alloys with XYZ half Heusler alloys like Ge/CoFeGe (which may form a single layer at room temperature or may be deposited as an alloy layer, where Ge is about 3 Å thick and CoFeGe is about 6 Å thick); and Ge/CoA (which may form a single layer at room temperature or may be deposited as an alloy layer), Ge/FeA (which may form a single layer at room temperature or may be deposited as an alloy layer), or Ge/NiA (which may form a single layer at room temperature or may be deposited as an alloy layer), where A can be one or more elements belonging to full Heusler alloys $X_2YZ$ or half Heusler alloys XYZ; or used in combination with very thin (i.e., dusting layers about 1 Å to about 5 Å thick) of nonmagnetic seed or capping layers of alloys of CuAg, NiCr, CoCu, AgSn, etc., such as Ge/X$_2$YZ/CuAg, Ge/X$_2$YZ/CuN, CuNi/Ge/X$_2$YZ, or CuAg/Ge/X$_2$YZ/CuNi. The alloy composition should be nonmagnetic as in the case of alloys with one of the aforementioned non-interacting elements or alloys of these elements like Ge where Ge exceeds about 44 at. % to render the alloy nonmagnetic.

Additionally, in some embodiments, the interlayer 308 may comprise nonmagnetic alloy or multilayer stack containing one or more of the following elements Cu, Ag, Ge, Mn, Ni, Co, Mo, W, In, B, Te, Se, Y, Pt, Ti, N, and Sn; or in conjunction with magnetic alloys such as CoA, FeA, and NiA, where A can be one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; where Y is selected from the group consisting of: Ti, V, Cr, Mn, Fe, Co, Ni, Zn, Y, Zr, Nb, Mo, Hf and W; and where Z is selected from the group consisting of: B, Al, Si, Ga, Ge, As, In, Sn, Sb, and Bi. The magnetic alloys or Heusler alloys should combine with other layers, combinations of elements, or other alloys to form a nonmagnetic layer or multilayer stack after room temperature deposition and intermixing, or deposited as a nonmagnetic single layer alloy, or in combinations thereof. The overall total thickness of the interlayer 308 is less than about 20 Å, such as about 3 Å to about 15 Å to ensure adequate magnetic coupling of the FM layer 312 to the BiSb layer 310. Nonmagnetic polycrystalline Heusler alloys may also be used for the interlayer 308, such as $V_2VAl$ or $[Mn_{0.5}Co_{0.5}]_2VAl$, etc.

The interlayer 308 should have higher resistivity and be nonmagnetic. Thin, high resistivity, low Z ceramic oxide and nitride layers of TiN, SiN, $Al_2O_3$, MgO, thin layers can be used in the interlayer 308. Furthermore, other materials that may be used as the interlayer 308 if not disposed in direct contact with the BiSb layer 310 include: high resistivity, heavier metal amorphous/nanocrystalline metals such as NiFeTa, NiTa, NiWTa, NiFeW, NiW, and WRe; nanocrystalline metals like beta-Ta or beta-W; or nitrides, oxides, or borides of the aforementioned elements or alloys such as NiTaN, NiFeTaN, NiWTaN, NiWN, WReN, TaN, WN, TaOx, WOx, TaBx, WBx, and HfBx. Higher resistivity, nonmagnetic alloys which don't readily interact with the BiSb layer 310 or the FM layer 312 may also be used for the interlayer 308, such as Cu, Ag, Ge, Mn, Ni, Co Mo, W, Sn, B, In, and multi-element alloys combinations thereof, like CuAg, CuNi, NiAg, CoCu, NiAl, RuAl, RhAl, CuCo, and AgSn.

Examples of high resistive, amorphous materials for the interlayer 308 include Ge (6 Å)/CoFe (4 Å)/CuAg (3 Å) (which may form a single layer at room temperature or may be deposited as an alloy layer), CuAg (3 Å)/Ge (5 Å)/CoFe (3 Å)/CuAg (2 Å) (which may form a single layer at room temperature or may be deposited as an alloy layer), or single alloy nonmagnetic layers of CoFeGe, NiFeGe, CoFeGeAg, among others. The interlayer 308 may comprise thin multilayer stacks consisting of the aforementioned elements, compounds, or crystalline/amorphous/nanocrystalline layers as long as the overall multilayer stack is nonmagnetic and has a high resistivity.

Magnetic alloys and magnetic Heusler alloys can be used for the interlayer 308 if used in combinations with other elements or alloys above such that when deposited, the materials intermix at room temperature, or after post annealing, to form a nonmagnetic stack. Examples include layers of NiFeX, CoFeX, NiX, FeX, CoX, where X is an element that does not readily interact with BiSb, such as Cu, Ag, Ge, Mn, Ni, Co, Mo, W, Sn, B, Te, Se, Y, Pt, Ti, N, and In, or magnetic Heusler alloys deposited on non-interacting element or alloy layers like Ge layers and in single alloy deposition layers where the resulting Ge content in the intermixed alloy renders it nonmagnetic (e.g., in the case of alloying with Ge the Ge content should be greater than or equal to about 44 at. %); or in combination with sufficiently thick layers of elements which do not readily interact with BiSb, such as Cu, Ag, Ge, Mn, Ni, Co, Mo, W, Sn, B, and In, to form multi-element, nonmagnetic, high resistivity combinations thereof; or single polycrystalline nonmagnetic Heusler layers.

Another example of materials that may be used for the interlayer 308 and/or the buffer layer 306 include: Ge/CoFe/NiFeTaN (where Ge/CoFe may form a single layer at room temperature or may be deposited as an alloy layer, and where Ge has a thickness of about 6 Å, CoFe has a thickness of about 4 Å, and NiFeTaN has a thickness of about 3 Å).

The buffer layer 306 may further comprise any of the above-listed materials used in the interlayer 308, such as a single alloy layer or layer combinations; nonmagnetic alloys or multilayer stacks comprising one or more of the following elements Cu, Ag, Ge, Mn, Ni, Mo, and W; or multi-element alloy combinations thereof; or in conjunction with magnetic and or nonmagnetic alloys such as CoA, FeA, NiA, where A is one or more elements belonging to full Heusler alloys $X_2YZ$ or half Heusler alloys XYZ, where X is selected from the group consisting of: Mn, Fe, Co, Ni, Cu, Ru, Rh, Pd, Ag, Ir, Pt, and Au; Y is selected from the group consisting of: Ti, V, Cr, Mn, Fe, Co, Ni, Zn, Y, Zr, Nb, Mo, Hf, and W; and Z is selected from the group consisting of: B, Al, Si, Ga, Ge, As, In, Sn, Sb, and Bi. The magnetic alloy or Heusler alloys should combine with other elements such as Cu, Ag, Ge, Mn, Co, Ni, Mo, Sn, In, B, Te, Se, Y, Pt, Ti, N, and W, or combine in multi-elemental alloy layers thereof, to form a nonmagnetic total stack buffer layer 306. The buffer layer 306 may be thin or relatively thick, such as having a thickness in the y-direction of about 5 Å to about 100 Å. A thicker buffer layer 306 can provide better migration resistance against elements from neighboring stacks getting into the BiSb layer 310, or provide better migration resistance of the Bi or the Sb migration out of the BiSb layer 310. The buffer layer 306 can be made thicker by lamination of layers to better control SOT nucleation/growth and texture.

Additional examples of materials that can be used for the buffer layer 306 include: [Ge/$X_2YZ$]*n laminations, [Ge/XYZ]*n laminations, and [Ge/XYZ]*n laminations, where n is a whole numeral; Ge-enriched $X_2YZ$ and Ge-enriched XYZ single layer alloys such that the buffer layer 306 is nonmagnetic (i.e., Ge>44%); [Ge (6 Å)/$Co_2$(MnFe)Ge (4 Å)]*4, [Ge (3 Å)/CoFeGe (6 Å)]*3, and [Ge (6 Å)/NiFe (4 Å)]*n; and with Ge alloyed or layered with NiA, FeA, CoA in lamination, where A is one or more elements belonging to full Heusler alloys $X_2YZ$ or half Heusler alloys XYZ, for example, [Ge (6 Å)/NiA (4 Å)]*n] where 1<n<4. The overall buffer layer 306 has a thickness between about 10 Å to about 50 Å.

FIGS. 4A-6B illustrate various views of a two dimensional magnetic recording (TDMR) SOT read heads 400, 500, 600, according to various embodiments. The read heads 400, 500, 600 may each individually be used in the magnetic recording head of the drive 100 of FIG. 1 or other suitable magnetic media drives, such as the read head 211 of FIG. 2. In some embodiments, the read heads 400, 500, 600 may be referred to as readers or TDMR SOT devices. Additionally, the various SOT devices/read head of FIGS. 4A-6B may be used in a magnetic sensor and as part of a memory structure in MRAM. Aspects of the SOT stacks 300, 350 and the read heads 400, 500, 600 may be used in combination with one another.

Figure 4A:
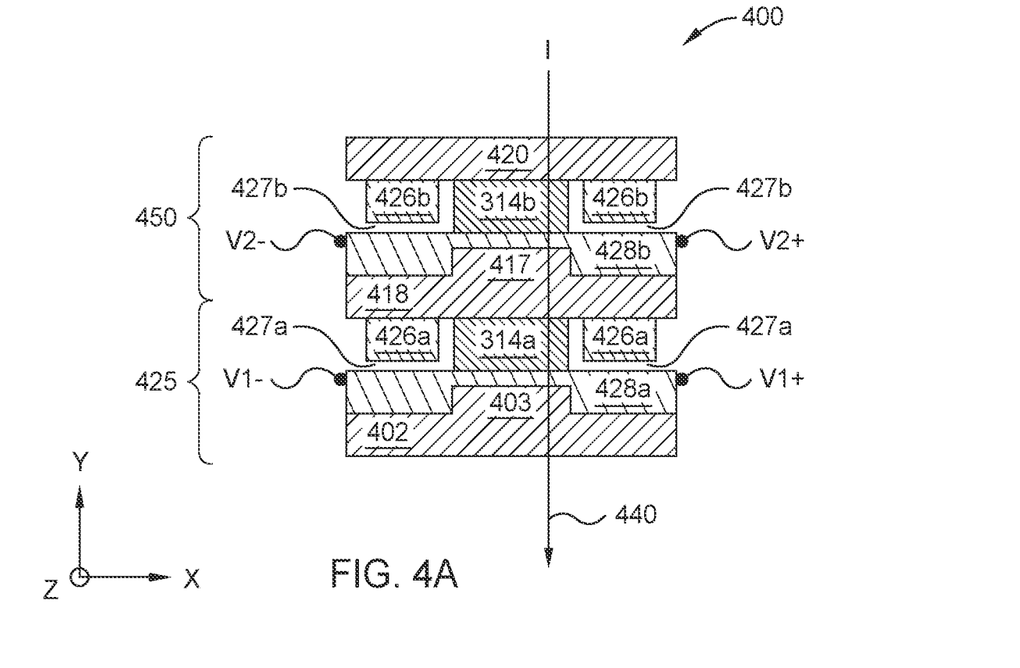
FIGS. 4A-4B illustrate various views of a TDMR SOT read head, according to one embodiment.
Figure 4B:
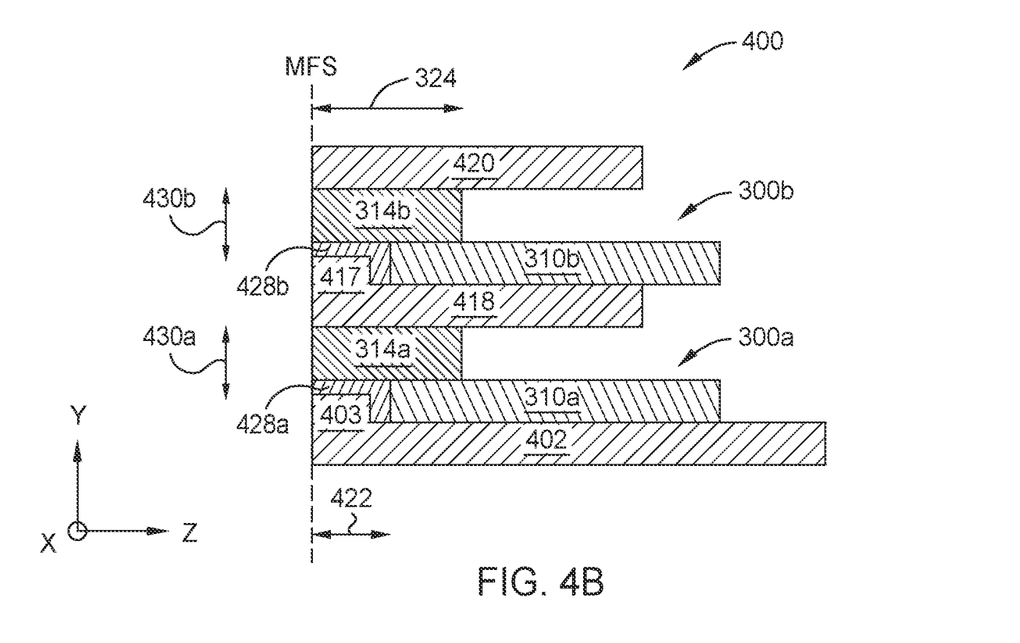

FIGS. 4A-4B illustrate various views of a TDMR SOT read head 400, according to one embodiment. FIG. 4A illustrates a MFS view of the read head 400, and FIG. 4B illustrates a cross-sectional view of the read head 400.

The read head 400 comprises two of the SOT stack 300 of FIG. 3A, where a lower reader 425 of the read head 400 comprises a first SOT stack 300a and an upper reader 450 of the read head 400 comprises a second SOT stack 300b. For clarity, only a first free layer 314a and a first BiSb layer 310a of the first SOT stack 300a, and a second free layer 314b and a second BiSb layer 310b of the second SOT stack 300b are shown. However, each SOT stack 300a, 300b comprises other layers, such as the buffer layer 306, the interlayer 308, and the FM layer 312, as discussed above. Thus, as referred to below, the BiSb layer 310a includes a buffer layer 306, an interlayer 308, and a FM layer 312 of the first SOT stack 300a, the BiSb layer 310b includes a buffer layer 306, an interlayer 308, and a FM layer 312 of the second SOT stack 300b, the free layer 314a includes the cap layer 316 of the first SOT stack 300a, and the free layer 314b includes the cap layer 316 of the second SOT stack 300b.

The read head 400 comprises a first lower shield (S1) 402 having a length in the z-direction of about 5 μm to about 20 μm and a thickness in the y-direction of about 1 μm. The first lower shield 402 comprises a S1 notch 403 at the MFS. The S1 notch 403 has a length in the z-direction of about 5 nm to about 20 nm and a thickness in the y-direction of about 1 nm to about 5 nm. The first lower shield 402 and the S1 notch 403 may each individually comprises a magnetic permeable and electrically conductive material selected from the group that includes NiFe, CoFe, NiFeCo, alloys, and their combination, NiFe, NiFeCr, or other soft magnetic materials. A first insulation layer 428a is disposed on the first lower shield 402 and the S1 notch 403 at the MFS. The first BiSb layer 310a of the first SOT stack 300a is disposed on the first lower shield 402, adjacent to the first insulation layer 428a, recessed from the MFS. A portion of the first insulation layer 428a is further disposed behind the S1 notch 403, recessed from the MFS, disposed in contact with the BiSb layer 310a. The first insulation layer 428a and the S1 notch 403 recess the BiSb layer 310a away from the MFS, preventing the BiSb layer 310a from being exposed at the MFS. The BiSb layer 310a is recessed from the MFS a distance 422 in the z-direction of about 5 nm to about 20 nm.

The free layer 314a of the first SOT stack 300a is disposed over the BiSb layer 310a and in contact with the first insulation layer 428a, and is exposed at the MFS. As shown in FIG. 4A, soft bias (SB) side shields 426a are disposed adjacent to the free layer 314a at the MFS. The SB side shields 426a may be spaced from the free layer 314a and the first insulation layer 428a by an additional insulation layer 427a. The additional insulation layer 427a may be a part of the first insulation layer 428a.

A middle shield (MS) 418 is disposed over the free layer 314a and the SB side shields 426a. The middle shield 418 acts as an upper shield to the lower reader 425, and as a lower shield to the upper reader 450. The middle shield 418 has a length in the z-direction of about 5 μm to about 20 μm and a thickness in the y-direction of about 10 nm to about 200 nm. The SB side shields 426a are disposed in contact with the middle shield 418. A first shield-to-shield spacing of the lower reader 425 is the distance 430a from the S1 notch 403 to the middle shield 418. Due to the S1 notch 403, the first shield-to-shield spacing of the lower reader 425 is reduced, which narrows the first read gap of the lower reader 425. The distance 430a is about 5 nm to about 20 nm. The S1 notch 403 is disposed at the MFS and has a portion recessed from the MFS to help confine the vertical current path.

The middle shield 418 further comprises a MS notch 417 at the MFS. The MS notch 417 has a thickness in the y-direction of about 1 nm to about 5 nm and a length in the z-direction of about 5 nm to about 20 nm. The middle shield 418 and the MS notch 417 may each individually comprises a magnetic permeable and electrically conductive material selected from the group that includes NiFe, CoFe, NiFeCo, alloys, and their combination, NiFe, NiFeCr, or other soft magnetic materials. A second insulation layer 428b is disposed on the middle shield 418 and the MS notch 417 at the MFS. A portion of the second insulation layer 428b is further disposed behind the MS notch 417, recessed from the MFS, disposed in contact with the BiSb layer 310b. The second BiSb layer 310b of the second SOT stack 300b is disposed on the middle shield 418, adjacent to the second insulation layer 428b, recessed from the MFS. The second insulation layer 428b and the MS notch 417 recess the BiSb layer 310b away from the MFS, preventing the BiSb layer 310b from being exposed at the MFS. The BiSb layer 310b is recessed from the MFS the distance 422 in the z-direction.

The free layer 314b of the second SOT stack 300b is disposed over the BiSb layer 310b and in contact with the second insulation layer 428b, and is exposed at the MFS. As shown in FIG. 4A, SB side shields 426b are disposed adjacent to the free layer 314b at the MFS. The SB side shields 426b are disposed in contact with a first upper shield 420 (S2). The SB side shields 426b may be spaced from the free layer 314b and the second insulation layer 428b by an additional insulation layer 427b. The additional insulation layer 427b may be a part of the second insulation layer 428b. The SB side shields 426a, 426b each individually comprises a magnetic material, such as NiFe. A first upper shield 420 is disposed over the free layer 314b and the SB side shields 426b. The first upper shield 420 may comprise a magnetic permeable and electrically conductive material selected from the group that includes NiFe, CoFe, NiFeCo, alloys, and their combination, NiFe, NiFeCr, or other soft magnetic materials. The first upper shield 420 may further comprise an anti-ferromagnetic (AFM) material, and have a length in the z-direction of about 5 μm to about 20 μm and a thickness in the y-direction of about 10 nm to several hundred nanometers. The insulation layers 428a, 428b, 427a, 427b each individually comprises an insulating material like SiN, AlOx, where x is a numeral, or an oxide like MgO, and can be used in combination with a Heusler alloy layer, and are adjacent to the BiSb layers to maintain texture and control Bi and Sb interdiffusion.

Each free layer 314a, 314b has the stripe height 324 in the z-direction of about 10 nm to about 20 nm. The distance 422 each BiSb layers 310a, 310b is recessed from the MFS is less than the stripe height 324 of the free layer. The BiSb layers 310a, 310b may also have a stripe height in the z-direction of about 10 nm to about 20 nm.

A second shield-to-shield spacing of the upper reader 450 is the distance 430b from the MS notch 417 to the first upper shield 420. Due to the MS notch 417, the second shield-to-shield spacing of the upper reader 450 is reduced, which narrows the second read gap of the upper reader 450. The distance 430b is about 5 nm to about 20 nm. The MS notch 417 is disposed at the MFS and has a portion recessed from the MFS to help confine the vertical current path.

During operation, current (I) is applied or injected into the first upper shield 420, such as by the current source 270 of FIG. 2. The current then flows down through the first upper shield 420 in the −y-direction through the free layer 314b, the BiSb layer 310b, the middle shield 418, the free layer 314a, the BiSb layer 310a, and the first lower shield 402 as the current return path, as shown by arrow 440 in FIG. 4A. While flowing, the induced voltage inside the BiSb layers 310a, 310b, due to an inverse spin Hall effect, is sensed or detected through the BiSb layers 310a, 310b, which are shown as the locations marked $V_1+$ and $V_1-$ for the lower reader 425 and $V_2+$ and $V_2-$ for the upper reader 450. In the read head 400, the lower reader 425 and the upper reader 450 have a shared current path. Because the BiSb layers 310a, 310b are recessed from the MFS and the free layers 314a, 314b are exposed at the MFS, the field sensing of the current of the read head 400 is improved. In some embodiments, the voltage leads $V_1+$, $V_1-$, $V_2+$, $V_2-$ are connected to the edge of the BiSb layers 310a, 310b, which are disposed behind (i.e., in the stripe height direction) the first and second insulation layers 428a, 428b.

Figure 5A:
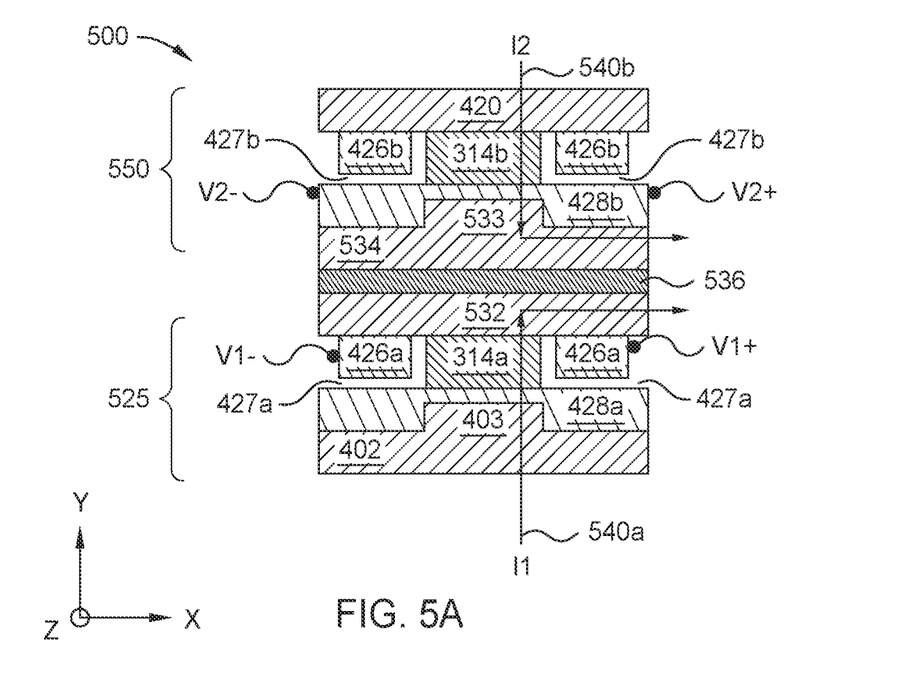
FIGS. 5A-5B illustrate various views of a TDMR SOT read head, according to another embodiment.
Figure 5B:
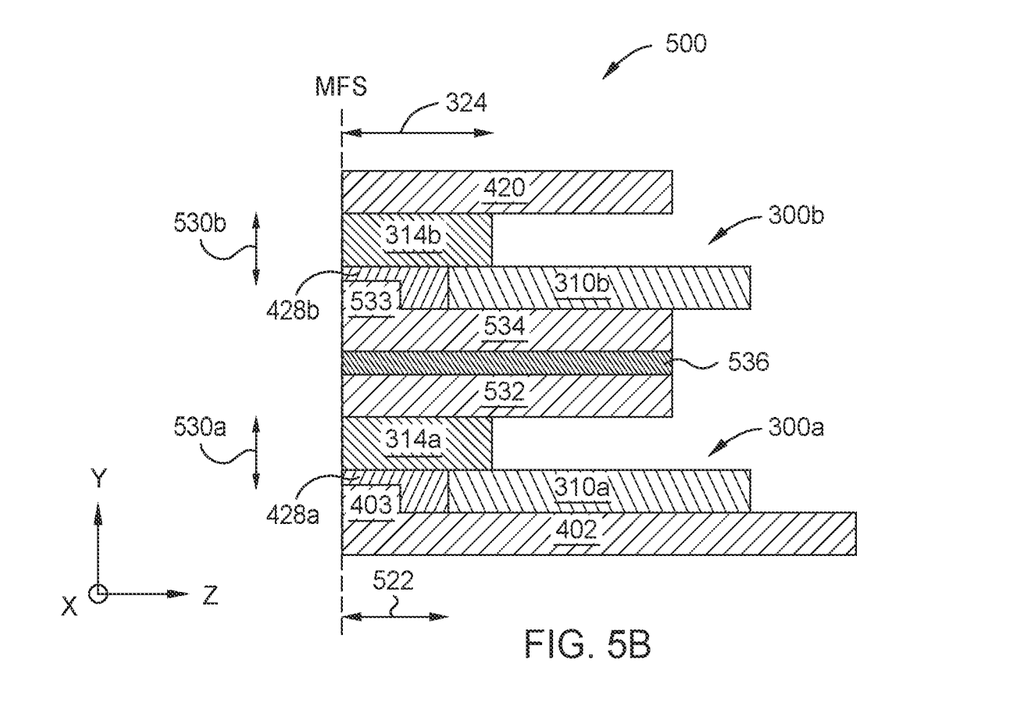

FIGS. 5A-5B illustrate various views of a TDMR SOT read head 500, according to another embodiment. FIG. 5A illustrates a MFS view of the read head 500, and FIG. 5B illustrates a cross-sectional view of the read head 500.

The read head 500 comprises two of the SOT stack 300 of FIG. 3A, where a lower reader 525 of the read head 500 comprises a first SOT stack 300a and an upper reader 550 of the read head 500 comprises a second SOT stack 300b. For clarity, only a first free layer 314a and a first BiSb layer 310a of the first SOT stack 300a, and a second free layer 314b and a second BiSb layer 310b of the second SOT stack 300b are shown. However, each SOT stack 300a, 300b comprises other layers, such as the buffer layer 306, the interlayer 308, and the FM layer 312, as discussed above. Thus, as referred to below, the BiSb layer 310a includes a buffer layer 306, an interlayer 308, and a FM layer 312 of the first SOT stack 300a, the BiSb layer 310b includes a buffer layer 306, an interlayer 308, and a FM layer 312 of the second SOT stack 300b, the free layer 314a includes the cap layer 316 of the first SOT stack 300a, and the free layer 314b includes the cap layer 316 of the second SOT stack 300b.

The read head 500 comprises the first lower shield (S1) 402. The first lower shield 402 comprises the S1 notch 403 at the MFS. The first insulation layer 428a is disposed on the first lower shield 402 and the S1 notch 403 at the MFS. The first BiSb layer 310a of the first SOT stack 300a is disposed on the first lower shield 402, adjacent to the first insulation layer 428a, recessed from the MFS. A portion of the first insulation layer 428a is further disposed behind the S1 notch 403, recessed from the MFS, disposed in contact with the BiSb layer 310a. The first insulation layer 428a and the S1 notch 403 recess the BiSb layer 310a away from the MFS, preventing the BiSb layer 310a from being exposed at the MFS. The BiSb layer 310a is recessed from the MFS the distance 522 in the z-direction of about 5 nm to about 20 nm.

The free layer 314a of the first SOT stack 300a is disposed over the BiSb layer 310a and in contact with the first insulation layer 428a, and is exposed at the MFS. As shown in FIG. 5A, SB side shields 426a are disposed adjacent to the free layer 314a at the MFS. The SB side shields 426a may be spaced from the free layer 314a and the first insulation layer 428a by the additional insulation layer 427a.

A second upper shield 532 is disposed over the free layer 314a. The second upper shield 532 has a length in the z-direction of about 5 μm to about 20 μm and a thickness in the y-direction of about 10 nm to about 200 nm. The SB side shields 426a are disposed in contact with a second upper shield 532. The lower reader 525 extends from the first lower shield 402 to the second upper shield 532. A first shield-to-shield spacing of the lower reader 525 is the distance 530a from the S1 notch 403 to second upper shield 532. Due to the S1 notch 403, the first shield-to-shield spacing of the lower reader 525 is reduced, which narrows the first read gap of the lower reader 525. The distance 530a is about 5 nm to about 20 nm. The S1 notch 403 is disposed at the MFS and has a portion recessed from the MFS to help confine the vertical current path. A third insulation layer 536 is disposed on the second upper shield 532, which separates the lower reader 525 from the upper reader 550.

A middle shield (MS) 534 is disposed on the third insulation layer 536. The middle shield 534 comprises a MS notch 533 at the MFS. The MS notch 533 has a thickness in the y-direction of about 1 nm to about 5 nm and a length in the z-direction of about 5 nm to about 20 nm. The middle shield 534 and the MS notch 533 may each individually comprise a magnetic permeable and electrically conductive material selected from the group that includes NiFe, CoFe, NiFeCo, alloys, and their combination, NiFe, NiFeCr, or other soft magnetic materials. The second insulation layer 428b is disposed on the middle shield 534 and the MS notch 533 at the MFS. A portion of the second insulation layer 428b is further disposed behind the MS notch 533, recessed from the MFS, disposed in contact with the BiSb layer 310b. The second BiSb layer 310b of the second SOT stack 300b is disposed on the second lower shield 534, adjacent to the second insulation layer 428b, recessed from the MFS. The second insulation layer 428b and the MS notch 533 recess the BiSb layer 310b away from the MFS, preventing the BiSb layer 310b from being exposed at the MFS. The BiSb layer 310b is recessed from the MFS the distance 522 in the z-direction.

The free layer 314b of the second SOT stack 300b is disposed over the BiSb layer 310b and in contact with the second insulation layer 428b, and is exposed at the MFS. As shown in FIG. 5A, SB side shields 426b are disposed adjacent to the free layer 314b at the MFS. The SB side shields 426b may be spaced from the free layer 314b and the second insulation layer 428b by the additional insulation layer 427b. The first upper shield 420 is disposed over the free layer 314b and the SB side shields 426b. The SB side shields 426b are disposed in contact with a first upper shield 420 (S2). The upper reader 550 extends from the middle shield 534 to the first upper shield 420.

Each free layer 314a, 314b has the stripe height 324 in the z-direction of about 10 nm to about 20 nm. The distance 522 each BiSb layers 310a, 310b is recessed from the MFS is less than the stripe height 324 of the free layers 314a, 314b. The BiSb layers 310a, 310b may also have a stripe height in the z-direction of about 10 nm to about 20 nm.

A second shield-to-shield spacing of the upper reader 550 is the distance 530b from the MS notch 533 to the first upper shield 420. Due to the MS notch 533, the second shield-to-shield spacing of the upper reader 550 is reduced, which narrows the second read gap of the upper reader 550. The distance 530b is about 5 nm to about 20 nm. The MS notch 533 is disposed at the MFS and has a portion recessed from the MFS to help confine the vertical current path.

During operation, a first current (I1) is applied or injected into the first lower shield 402, such as by the current source 270 of FIG. 2, for sensing of the lower reader 525. The first current then flows up through the first lower shield 402 in the y-direction through the BiSb layer 310a, the free layer 314a, and out through the first upper shield 532 as the current return path, as shown by arrow 540a in FIG. 5A, to a lead not shown in this Figure or FIG. 2. While flowing, the first induced voltage inside the BiSb layer 310a, due to inverse spin Hall effect, is sensed or detected through the BiSb layer 310a, which are shown as the locations marked $V_1+$ and $V_1-$. In some embodiments, the voltage leads $V_1+$, $V_1-$ are connected to the edge of the BiSb layer 310a, which is disposed behind the first insulation layer 428a.

Additionally, during operation, a second current (I2) is applied or injected into the first upper shield 420, such as by the current source 270 of FIG. 2, for sensing of the upper reader 550. The second current then flows down through the first upper shield 420 in the -y-direction through the free layer 314b, the BiSb layer 310b, and out through the middle shield 534 as the current return path, as shown by arrow 540b in FIG. 5A, to a lead not shown in this Figure or FIG. 2. While flowing, the second induced voltage inside the BiSb layer 310b, due to inverse spin Hall effect, is sensed or detected through the BiSb layer 310b, which are shown as the locations marked $V_2+$ and $V_2-$. In some embodiments, the voltage leads $V_2+$, $V_2-$ are connected to the edge of the BiSb layer 310b, which is disposed behind the second insulation layer 428b.

Thus, the lower reader 525 and the upper reader 550 have separate current paths. Because the BiSb layers 310a, 310b are recessed from the MFS and the free layers 314a, 314b are exposed at the MFS, the field sensing of the current of the read head 500 is improved.

Figure 6A:
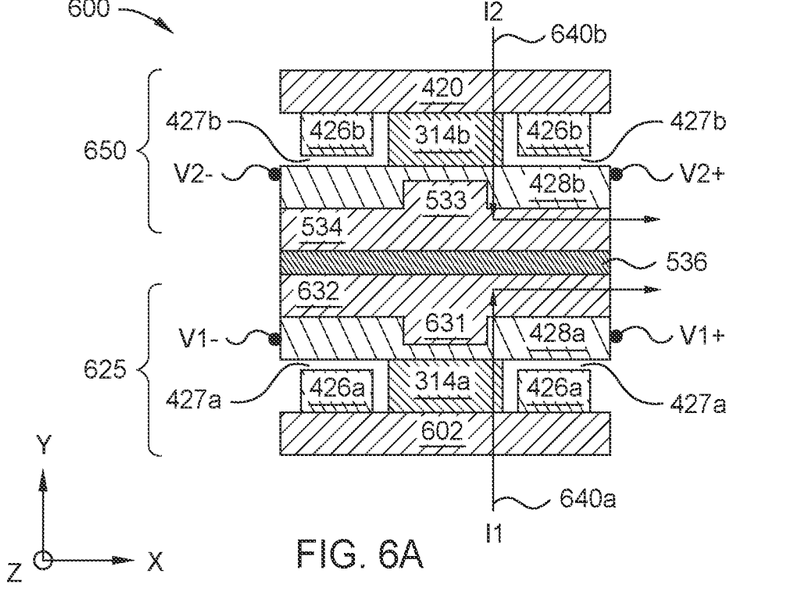
FIGS. 6A-6B illustrate various views of a TDMR SOT read head, according to yet another embodiment.
Figure 6B:
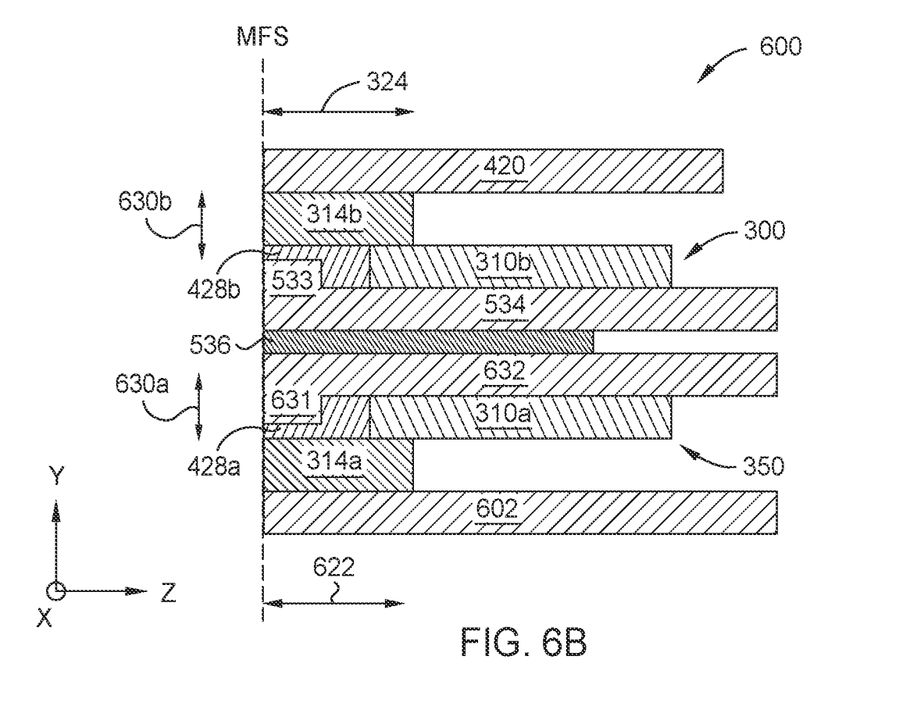

FIGS. 6A-6B illustrate various views of a TDMR SOT read head 600, according to yet another embodiment. FIG. 6A illustrates a MFS view of the read head 600, and FIG. 6B illustrates a cross-sectional view of the read head 600.

The read head 600 comprises one SOT stack 300 of FIG. 3A and one SOT stack 350 of FIG. 3B, where a lower reader 625 of the read head 600 comprises the SOT stack 350 and an upper reader 650 of the read head 600 comprises the SOT stack 300. For clarity, only a first free layer 314a and a first BiSb layer 310a of the SOT stack 350, and a second free layer 314b and a second BiSb layer 310b of the SOT stack 300 are shown. However, each SOT stack 300, 350 comprises other layers, such as the buffer layer 306, the interlayer 308, and the FM layer 312, as discussed above. Thus, as referred to below, the BiSb layer 310a includes a buffer layer 306, an interlayer 308, and a FM layer 312 of the SOT stack 350, the BiSb layer 310b includes a buffer layer 306, an interlayer 308, and a FM layer 312 of the SOT stack 300, the free layer 314a includes the cap layer 316 of the SOT stack 350, and the free layer 314b includes the cap layer 316 of the SOT stack 300.

The read head 600 comprises a first lower shield (S1) 602. The first lower shield 602 may comprise a magnetic permeable and electrically conductive material selected from the group that includes NiFe, CoFe, NiFeCo, alloys, and their combination, NiFe, NiFeCr, or other soft magnetic materials. The free layer 314a of the SOT stack 350 is disposed on the first lower shield 602 and is exposed at the MFS. The first insulation layer 428a is disposed on and in contact with the free layer 314a at the MFS. The first BiSb layer 310a of the SOT stack 350 is disposed over the free layer 314a, adjacent to and in contact with the first insulation layer 428a, recessed from the MFS. The BiSb layer 310a is recessed from the MFS the distance 622 in the z-direction of about 5 nm to about 20 nm.

A second upper shield (US2) 632 is disposed over the BiSb layer 310a and the first insulation layer 428a. The second upper shield 632 comprises a US2 notch 631 at the MFS, where the US2 notch 631 extends in the y-direction towards the free layer 314a. The US2 notch 631 has a thickness in the y-direction of about 1 nm to about 5 nm and a length in the z-direction of about 5 nm to about 20 nm. The second upper shield 632 and the MS notch 533 may each individually comprise a magnetic permeable and electrically conductive material selected from the group that includes NiFe, CoFe, NiFeCo, alloys, and their combination, NiFe, NiFeCr, or other soft magnetic materials. A portion of the first insulation layer 428a is further disposed behind the US2 notch 631, recessed from the MFS, disposed in contact with the BiSb layer 310a. The first insulation layer 428a and the US2 notch 631 recess the BiSb layer 310a away from the MFS, preventing the BiSb layer 310a from being exposed at the MFS.

As shown in FIG. 6A, SB side shields 426a are disposed adjacent to the free layer 314a at the MFS. The SB side shields 426a may be spaced from the free layer 314a and the first insulation layer 428a by the additional insulation layer 427a. The SB side shields 426a are disposed in contact with a first lower shield 602. A third insulation layer 536 is disposed on the second upper shield 632, which separates the lower reader 625 from the upper reader 650.

The lower reader 625 extends from the first lower shield 602 to the second upper shield 632. A first shield-to-shield spacing of the lower reader 625 is the distance 630a from the first lower shield 602 to US2 notch 631. Due to the US2 notch 631, the first shield-to-shield spacing of the lower reader 625 is reduced, which narrows the first read gap of the lower reader 625. The distance 630a is about 5 nm to about 20 nm. The US2 notch 631 is disposed at the MFS and has a portion recessed from the MFS to help confine the vertical current path. The third insulation layer 536, which separates the lower reader 625 from the upper reader 650, is disposed on the second upper shield 632.

The middle shield (MS) 534 is disposed on the third insulation layer 536. The middle shield 534 comprises the MS notch 533 at the MFS. The MS notch 533 has a height in the y-direction of about 1 nm to about 5 nm and a thickness in the z-direction of about 5 nm to about 20 nm. The second insulation layer 428b is disposed on the middle shield 534 and the MS notch 533 at the MFS. A portion of the second insulation layer 428b is further disposed behind the MS notch 533, recessed from the MFS, disposed in contact with the BiSb layer 310b. The second BiSb layer 310b of the SOT stack 300 is disposed on the second lower shield 534, adjacent to the second insulation layer 428b, recessed from the MFS. The second insulation layer 428b and the MS notch 533 recess the BiSb layer 310b away from the MFS, preventing the BiSb layer 310b from being exposed at the MFS. The BiSb layer 310b is recessed from the MFS the distance 622 in the z-direction.

The free layer 314b of the SOT stack 300 is disposed over the BiSb layer 310b and in contact with the second insulation layer 428b, and is exposed at the MFS. As shown in FIG. 6A, SB side shields 426b are disposed adjacent to the free layer 314b at the MFS. The SB side shields 426b may be spaced from the free layer 314b and the second insulation layer 428b by the additional insulation layer 427b. The first upper shield 420 is disposed over the free layer 314b and the SB side shields 426b. The SB side shields 426b are disposed in contact with a first upper shield 420. The upper reader 650 extends from the middle shield 534 to the first upper shield 420.

Each free layer 314a, 314b has the stripe height 324 in the z-direction of about 10 nm to about 20 nm. The distance 622 each BiSb layers 310a, 310b is recessed from the MFS is less than the stripe height 324 of the free layers 314a, 314b. The BiSb layers 310a, 310b may also have a stripe height in the z-direction of about 10 nm to about 20 nm.

A second shield-to-shield spacing of the upper reader 650 is the distance 630b from the MS notch 533 to the first upper shield 420. Due to the MS notch 533, the second shield-to-shield spacing of the upper reader 650 is reduced, which narrows the second read gap of the upper reader 650. The distance 630b is about 5 nm to about 20 nm. The MS notch 533 is disposed at the MFS and has a portion recessed from the MFS to help confine the vertical current path.

Furthermore, because the read head 600 comprises one SOT stack 300 and one SOT stack 350, the first BiSb layer 310a of the SOT stack 350 and the second BiSb layer 310b of the SOT stack 300 are disposed closer together in the y-direction, as compared to the read head 400 of FIGS. 4A-4B and the read head 500 of FIG. 5A-5B. For example, the first BiSb layer 310a is only spaced from the second BiSb layer 310b by the second upper shield 632, the third insulation layer 536, and the second lower shield 534, a total distance of about 20 nm to about 200 nm.

During operation, a first current (I1) is applied or injected into the first lower shield 602, such as by the current source 270 of FIG. 2, for sensing of the lower reader 625. The first current then flows up through the first lower shield 602 in the y-direction through the BiSb layer 310a, the free layer 314a, and out through the second upper shield 632 as the current return path, as shown by arrow 640a in FIG. 6A, to a lead not shown in this Figure or FIG. 2. While flowing, the first induced voltage inside the BiSb layer 310a, due to inverse spin Hall effect, is sensed or detected through the BiSb layer 310a, which are shown as the locations marked $V_1+$ and $V_1-$. In some embodiments, the voltage leads $V_1+$, $V_1-$ are connected to the edge of the BiSb layer 310a, which is disposed behind the first insulation layer 428a.

Additionally, during operation, a second current (I2) is applied or injected into the first upper shield 420, such as by the current source 270 of FIG. 2, for sensing of the upper reader 650. The second current then flows down through the first upper shield 420 in the −y-direction through the free layer 314b, the BiSb layer 310b, and out through the middle shield 534 as the current return path, as shown by arrow 640b in FIG. 6A, to a lead not shown in this Figure or FIG. 2. While flowing, the second induced voltage inside the BiSb layer 310b, due to inverse spin Hall effect, is sensed or detected through the BiSb layer 310b, which are shown as the locations marked $V_2+$ and $V_2-$. In some embodiments, the voltage leads $V_2+$, $V_2-$ are connected to the edge of the BiSb layer 310b, which is disposed behind the second insulation layer 428b.

Thus, the lower reader 625 and the upper reader 650 have separate current paths. Because the BiSb layers 310a, 310b are recessed from the MFS and the free layers 314a, 314b are exposed at the MFS, the field sensing of the current of the read head 600 is improved.

Thus, by having the free layers of a TDMR SOT read head disposed at the MFS while recessing the BiSb layers away from the MFS, the shield-to-shield spacing of each SOT stack of the TDMR SOT read head is reduced, which in turn, narrows the read gap of each SOT stack of the TDMR SOT read head. Furthermore, because the BiSb layers are recessed from the MFS and the free layers are exposed at the MFS, the field sensing of the current is improved during operation, improving the signal-to-noise ratio.

In one embodiment, a read head comprises a lower shield extending to a media facing surface (MFS), a first spin-orbit torque (SOT) stack disposed over the lower shield, the first SOT stack comprising: a first bismuth antimony (BiSb) layer recessed from the MFS, and a first free layer disposed over the first BiSb layer, the first free layer being exposed at the MFS, a middle shield disposed over the first free layer, the middle shield extending to the MFS, a second SOT stack disposed over the middle shield, the second SOT stack comprising: a second BiSb layer recessed from the MFS, and a second free layer disposed over the second BiSb layer, the second free layer being exposed at the MFS, and an upper shield disposed over the second free layer, the upper shield extending to the MFS.

The read head further comprises a first notch disposed on the first shield at the MFS, wherein the first BiSb layer is disposed adjacent to the first notch, a first insulation layer disposed on the first notch at the MFS, the first insulation layer being in contact with the first free layer and the first BiSb layer, a second notch disposed on the middle shield at the MFS, wherein the second BiSb layer is disposed adjacent to the second notch, and a second insulation layer disposed on the second notch at the MFS, the second insulation layer being in contact with the second free layer and the second BiSb layer. A first read gap is defined from the first notch to the middle shield, and a second read gap is defined from the second notch to the upper shield.

The read head further comprises first soft bias (SB) side shields disposed adjacent to the first free layer at the MFS, the first SB side shields being disposed in contact with the middle shield, and second SB side shields disposed adjacent to the second free layer and the MFS, the second SB side shields being disposed in contact with the upper shield. The first BiSb layer and the second BiSb layer are each recessed a distance of about 5 nm to about 20 nm from the MFS. The first free layer and the second free layer each have a length extending from the MFS into the read head greater than the distance the first BiSb layer and the second BiSb layer are recessed from the MFS. The read head further comprises means for flowing a current vertically through the upper shield into the second SOT stack and the first SOT stack to the lower shield. A magnetic recording head comprising the read head. A magnetic recording device comprising the magnetic recording head.

In another embodiment, a read head comprises a first reader, the first reader comprising: a first lower shield extending to a media facing surface (MFS), a first bismuth antimony (BiSb) layer disposed over the first lower shield, the first BiSb layer being recessed from the MFS, a first free layer disposed over the first BiSb layer, the first free layer being exposed at the MFS, and a first upper shield disposed over the first free layer, and a second reader disposed over the first upper shield, the second reader comprising: a second lower shield extending to the MFS, a second BiSb layer disposed over the second lower shield, the second BiSb layer being recessed from the MFS, a second free layer disposed over the second BiSb layer, the second free layer being exposed at the MFS, and a second upper shield disposed over the second free layer.

The read head further comprises a first insulation layer disposed between and in contact with the first upper shield and the second lower shield. The read head further comprises a first a first notch disposed on the first lower shield at the MFS, wherein the first BiSb layer is disposed adjacent to the first notch, and a second notch disposed on the second lower shield at the MFS, wherein the second BiSb layer is disposed adjacent to the second notch. The read head further comprises a second insulation layer disposed on the first notch at the MFS, the second insulation layer being in contact with the first free layer and the first BiSb layer, and a third insulation layer disposed on the second notch at the MFS, the third insulation layer being in contact with the second free layer and the second BiSb layer.

The first BiSb layer and the second BiSb layer are each recessed a first distance of about 5 nm to about 20 nm from the MFS, and a first length of the second insulation layer is equal to the first distance. The first free layer and the second free layer each have a second length than the first length. The read head further comprises means for flowing a first current through the first lower shield, the first BiSb layer, and the first free layer to the first upper shield, and means for flowing a second current through the second upper shield, the second BiSb layer, and the second free layer to the second lower shield. A magnetic recording head comprising the read head. A magnetic recording device comprising the magnetic recording head.

In yet another embodiment, a read head comprises a first reader, the first reader comprising: a first lower shield extending to a media facing surface (MFS), a first free layer disposed over the first lower shield, the first free layer being exposed at the MFS, a first bismuth antimony (BiSb) layer disposed over the first free layer, the first BiSb layer being recessed from the MFS, and a first upper shield disposed over the first BiSb layer, and a second reader disposed over the first upper shield, the second reader comprising: a second lower shield extending to the MFS, a second free layer disposed over the second lower shield, the second free layer being exposed at the MFS, a second BiSb layer disposed over the second free layer, the second BiSb layer being recessed from the MFS, and a second upper shield disposed over the second BiSb layer.

The read head further comprises a first a first notch disposed on the second upper shield at the MFS, wherein the first BiSb layer is disposed adjacent to the first notch, and a second notch disposed on the second lower shield at the MFS, wherein the second BiSb layer is disposed adjacent to the second notch. The read head further comprises a first insulation layer disposed between and in contact with the first upper shield and the second lower shield, wherein the first BiSb layer is spaced from the second BiSb layer by the first upper shield, the first insulation layer, and the second lower shield, a second insulation layer disposed on the first notch at the MFS, the second insulation layer being in contact with the first free layer and the first BiSb layer, and a third insulation layer disposed on the second notch at the MFS, the third insulation layer being in contact with the second free layer and the second BiSb layer.

The first BiSb layer and the second BiSb layer are each recessed a first distance of about 5 nm to about 20 nm from the MFS, and wherein the first free layer and the second free layer each have a first length of about 10 nm to about 20 nm. The first length is greater than the first distance. The first reader further comprises: a first cap layer disposed between the first lower shield and the first free layer, a first ferromagnetic (FM) layer disposed over the first free layer, a first interlayer disposed between the first FM layer and the first BiSb layer, and a buffer layer disposed between the first BiSb layer and the first upper shield. The second reader further comprises: a second buffer layer disposed between the second lower shield and the second BiSb layer, a second interlayer disposed over the second BiSb layer, a second FM layer disposed between the second interlayer and the second free layer, and a second cap layer disposed between the second free layer and the second upper shield. The first FM layer, the first interlayer, the first buffer layer, the second buffer layer, the second interlayer, and the second FM layer are recessed from the MFS.

The read head further comprises: means for flowing a first current through the first lower shield, the first free layer, and the first BiSb layer to the first upper shield, and means for flowing a second current through the second upper shield, the second BiSb layer, and the second free layer to the second lower shield. A magnetic recording head comprising the read head. A magnetic recording device comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a lower shield extending to a media facing surface (MFS);
a first spin-orbit torque (SOT) stack disposed over the lower shield, the first SOT stack comprising:
   a first SOT layer recessed from the MFS; and
   a first free layer disposed over the first SOT layer, the first free layer being exposed at the MFS;
a middle shield disposed over the first free layer, the middle shield extending to the MFS;
a second SOT stack disposed over the middle shield, the second SOT stack comprising:
   a second SOT layer recessed from the MFS; and
   a second free layer disposed over the second SOT layer, the second free layer being exposed at the MFS; and
an upper shield disposed over the second free layer, the upper shield extending to the MFS.

2. The read head of claim 1, further comprising:
a first notch disposed on the lower shield at the MFS, wherein the first SOT layer is disposed adjacent to the first notch;
a first insulation layer disposed on the first notch at the MFS, the first insulation layer being in contact with the first free layer and the first SOT layer;
a second notch disposed on the middle shield at the MFS, wherein the second SOT layer is disposed adjacent to the second notch; and
a second insulation layer disposed on the second notch at the MFS, the second insulation layer being in contact with the second free layer and the second SOT layer.

3. The read head of claim 2, wherein a first read gap is defined from the first notch to the middle shield, and wherein a second read gap is defined from the second notch to the upper shield.

4. The read head of claim 1, further comprising:
first soft bias (SB) side shields disposed adjacent to the first free layer at the MFS, the first SB side shields being disposed in contact with the middle shield; and
second SB side shields disposed adjacent to the second free layer and the MFS, the second SB side shields being disposed in contact with the upper shield.

5. The read head of claim 1, wherein the first SOT layer and the second SOT layer are each recessed a distance of about 5 nm to about 20 nm from the MFS.

6. The read head of claim 5, wherein the first free layer and the second free layer each have a length extending from the MFS into the read head greater than the distance the first SOT layer and the second SOT layer are recessed from the MFS.

7. The read head of claim 1, further comprising means for flowing a current vertically through the upper shield into the second SOT stack and the first SOT stack to the lower shield.

8. A magnetic recording head comprising the read head of claim 1.

9. A magnetic recording device comprising the magnetic recording head of claim 8.

10. A read head, comprising:
a first reader, the first reader comprising:
   a first lower shield extending to a media facing surface (MFS);
   a first spin-orbit torque (SOT) layer disposed over the first lower shield, the first SOT layer being recessed from the MFS;
   a first free layer disposed over the first SOT layer, the first free layer being exposed at the MFS; and
   a first upper shield disposed over the first free layer; and
a second reader disposed over the first upper shield, the second reader comprising:
   a second lower shield extending to the MFS;
   a second SOT layer disposed over the second lower shield, the second SOT layer being recessed from the MFS;
   a second free layer disposed over the second SOT layer, the second free layer being exposed at the MFS; and
   a second upper shield disposed over the second free layer.

11. The read head of claim 10, further comprising a first insulation layer disposed between and in contact with the first upper shield and the second lower shield.

12. The read head of claim 10, further comprising:
a first notch disposed on the first lower shield at the MFS, wherein the first SOT layer is disposed adjacent to the first notch; and
a second notch disposed on the second lower shield at the MFS, wherein the second SOT layer is disposed adjacent to the second notch.

13. The read head of claim 12, further comprising:
a second insulation layer disposed on the first notch at the MFS, the second insulation layer being in contact with the first free layer and the first SOT layer; and
a third insulation layer disposed on the second notch at the MFS, the third insulation layer being in contact with the second free layer and the second SOT layer.

14. The read head of claim 13, wherein the first SOT layer and the second SOT layer are each recessed a first distance of about 5 nm to about 20 nm from the MFS, and wherein a first length of the second insulation layer is equal to the first distance.

15. The read head of claim 14, wherein the first free layer and the second free layer each have a second length greater than the first length.

16. The read head of claim 10, further comprising:
means for flowing a first current through the first lower shield, the first SOT layer, and the first free layer to the first upper shield; and
means for flowing a second current through the second upper shield, the second SOT layer, and the second free layer to the second lower shield.

17. A magnetic recording head comprising the read head of claim 10.

18. A magnetic recording device comprising the magnetic recording head of claim 17.

19. A read head, comprising:
a lower shield extending to a media facing surface (MFS);
a first SOT layer disposed over the lower shield, the first SOT layer being recessed from the MFS;
a first free layer disposed in contact with the first SOT layer, the first free layer being exposed at the MFS;
a second SOT layer disposed over the first free layer, the second SOT layer being recessed from the MFS;
a second free layer disposed in contact with the second SOT layer, the second free layer being exposed at the MFS; and
an upper shield disposed over the second free layer, the upper shield extending to the MFS.

20. The read head of claim 19, further comprising a middle shield disposed between the first free layer and the second SOT layer.

21. The read head of claim 20, further comprising:
a first notch disposed on the lower shield at the MFS, wherein the first SOT layer is disposed adjacent to the first notch; and
a second notch disposed on the middle shield at the MFS, wherein the second SOT layer is disposed adjacent to the second notch.

22. The read head of claim 21, further comprising:
a first insulation layer disposed on the first notch at the MFS, the first insulation layer being in contact with the first free layer and the first SOT layer; and
a second insulation layer disposed on the second notch at the MFS, the second insulation layer being in contact with the second free layer and the second SOT layer.

23. The read head of claim 21, wherein a first read gap is defined from the first notch to the middle shield, and wherein a second read gap is defined from the second notch to the upper shield.

24. The read head of claim 19, wherein the first SOT layer and the second SOT layer are each recessed a first distance of about 5 nm to about 20 nm from the MFS.

25. The read head of claim 19, wherein the first free layer and the second free layer each have a length extending from the MFS into the read head greater than the distance the first SOT layer and the second SOT layer are recessed from the MFS.

26. The read head of claim 19, further comprising means for flowing a current vertically through the upper shield into the second SOT layer and the first SOT layer to the lower shield.

27. A magnetic recording head comprising the read head of claim 19.

28. A magnetic recording device comprising the magnetic recording head of claim 27.

* * * * *